3,186,903
SYNERGISTIC PYRETHRUM INSECTICIDE
William T. Soltes, 3290 S.W. 25th St., Miami, Fla.
No Drawing. Filed Sept. 1, 1960, Ser. No. 53,373
3 Claims. (Cl. 167—24)

This invention relates to novel, synergized biological compositions of matter. More particularly, this invention is concerned with new insecticidal compositions containing a toxic substance, especially pyrethrum and the like, and one or more additional substances, the combinations of substances affording highly effective insecticidal action not heretofore possessed by other pyrethrum-containing compositions.

Pyrethrum has long been used as an effective ingredient of insecticidal compositions. Recently, its active toxic components have been isolated and their chemical structures at least tentatively determined. According to what seems to be the most widely accepted information, the active ingredients are reported to be esters of complex organic acids, the esters reportedly being named pyrethrin I and pyrethrin II, cinerin I and cinerin II having the following general formula:

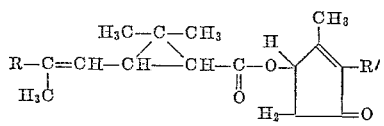

In the above general formula the pyrethrins are provided where R′=—CH$_2$—CH=CH—CH=CH$_2$, pyrethrin I being the compound where R=CH$_3$—, pyrethrin II being the compound where R=

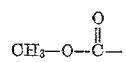

Cinerin I and II respectively are similar to pyrethrins I and II except that in the cinerins, R′ is the radical —CH$_2$—CH=CH—CH$_3$. As will be understood, however, the present invention is concerned with new compositions and methods employing pyrethrum and similar substances as hereinafter more fully described, regardless of what its actual chemical nature may be.

In the past, pyrethrum has been employed substantially exclusively in formulations especially adapted to household use in the control of flies, mosquities, etc. For the most part, these have been hydrocarbon oil dispersions, such as moderately to highly refined kerosene oil formulations. It has also been employed widely in the form of aerosols and dusts. Although pyrethrum more recently has been experiencing a growth in use as an agricultural insecticide, it still is used in this capacity to an extent perhaps not greater than ten percent of the total pyrethrum usage. The low order of toxicity to mammals relative to the dosage of pyrethrum has also been a factor in its household use. There are several considerations which have directed the pattern of application of pyrethrum, the important considerations, insofar as this invention is concerned, being those disadvantages and limitations inherent in the substance itself and the formulations heretofore employed. In order more fully to appreciate the remarkable contribution of this invention to the ever-present problem of insect control, both household and agricultural, it will be helpful to consider briefly the problems presented by pyrethrum's use in the past.

Pyrethrum is classified as an insecticide of the knockdown type. Employed alone, therefore, it functions to effect paralysis upon contact, being also known as a contact insecticide having little systemic poisoning power. When used in very high concentration, it can effect 90 percent or better knockdown, measured according to standard testing procedure, within a few minutes. Thus, its immediate effectiveness is excellent. However, its power to maintain knockdown control, i.e., bring about paralysis of the insects to be controlled for a long period of time, is not at all impressive. This has been explained by numerous persons knowledgeable in the art as being due to the rapid breakdown and volatility of the toxic pyrethrin content under the effects of heat, light, air, alkaline materials such as lime which is often present where the material is applied, acids, soap, etc. Consequently, pyrethrum insecticides are regarded generally as having a short residual life and effectiveness. Another way of stating this is that the pyrethrin content is not sufficiently persistent in its paralytic effects and must in some way be stabilized, thereby rendering it more permanent, if it is to provide long lasting practical results. Heretofore, the life of pyrethrum has ranged from a few minutes to at most a few hours depending largely upon the conditions under which it is applied. Stabilizers have provided some improvement; however, not enough, considering the quantity of pyrethrum necessary to afford reasonably practical general application including agricultural uses, animal sprays, etc. Moreover, hydrocarbon carriers, which are known to function as stibilizers for pyrethrum to some extent, restrict agricultural use since they are highly phytotoxic to plant life.

Since pyrethrum is not a systemic poison for the pests most desirable to be controlled, at least not so at the concentrations usually employed, and since its residual paralytic power is of quite short duration, the insect mortality rate for pyrethrum is practically nil. Standard tests for knockdown and mortality rates reveal not more than ten percent mortality, and usually less, during a twenty-four hour test. Thus, it can be appreciated why it is that pyrethrum as such, as well as when stabilized in manners best known, still remains strongly limited in its range of application.

Much work has been done by highly skilled artisans seeking to enhance the effectiveness of pyrethrum so as to render it more widely useable, in the course of which, several materials have been found to provide improvements. Synergistic action has been found to result in the combination of pyrethrum with certain chemicals, among the better known and most notable in the sense of their degree of improvement of which are N-isobutyl-10-undecylenamide, sesamin, "piperonylcyclonene" (3-isoamyl - 5 - (3,4 -methylenedioxyphenyl) - 2 - cyclohexen-1-one), and "piperonyl butoxide" (a-[2-(2-butoxyethoxy)ethoxy]4,5 - methylenedioxy - 2 - propyl toluene). The only one of these synergists which has achieved substantial acceptance and usage in the trade is the pyrethrum-piperonyl butoxide combination, and it is believed that such formulations are regarded as the most effective pyrethrum formulations on the present market. Even so, the pyrethrum concentration necessary to attain effective control is found to be many hundred parts per million. Moreover, persistence of the formulation in point of time is not found to be great in the sense that a single application exhibits outstanding control in agricultural applications; on the contrary, one to three days appears to be its life under normal conditions of application.

It seems hardly necessary to comment further, but it may be said that what is needed is a combination of ingredients including pyrethrum having long and steady residual life, i.e., persisting high level toxicity effects over weeks and months, which continue under adverse conditions, adaptable to a variety of manners of application and requiring small quantities of active ingredients. Such are the compositions afforded by the present invention and the objectives of this invention may at least in part be thus summarized.

It has now been discovered in the course of investigating the general problems indicated above, and in accordance with the present invention, that remarkably toxically effective insecticides are afforded by compositions comprising pyrethrum and an oil derived from the foliage of certain trees of the pine family, especially an oil known commercially as Siberian fir needle oil, *Abies siberica*. The invention is thus broadly envisioned, although it is preferred, as will appear more fully hereinafter, to compound these two types of materials together with other oils and additives which perform additional functions of assisting in stabilization of the insecticidal formulation, penetration and adhesion of the product, etc. The compositions are not only remarkable in respects of toxicity to household pests including flies, mosquitoes, ants, roaches, fleas, spiders, mealy bugs, horn flies, deer flies, drosophilla flies, etc., especially when containing pyrethrum in as little as a few parts per million, but they are also equally effective in agricultural uses in controlling substantially all members of the insect kingdom under severe conditions of temperature, humidity, etc., such as are encountered for long periods of time in semitropical areas, for example, southern Florida. Thus, the new compositions substantially completely control aphids, which are so destructive to many growing crops, such as the green peach aphid which attacks celery, peppers, corn, beans, turnip greens, etc., the black bean aphid which destroys peas and beans, the woolly aphid which attacks apple orchards, etc. The new compositions similarly control beetles, caterpillars, leaf hoppers, moths, loopers and many other insects. The new compositions are also exceptionally useful as soil insecticides, for example, in the control of grubs, bettles, larvae, ants, chinch bugs, etc.

Not only are the compositions of the invention uniquely effective in that they far surpass the best known synergized composition presently known in their toxic effectiveness at very small pyrethrum concentration, such other compositions requiring hundreds of times more in quantity, but their persistence of activity is found to be substantially undiminished after many months' exposure under severe weather conditions. This fact is not only important from the standpoint of the occurrence of mortality in a particular infestation to be controlled, but it is substantially equally important to the problem of repeated applications of insecticidal materials to control successive infestations, as will surely be appreciated by those concerned with successful crop growth. For example, sixteen days after an application of a composition, prepared according to this invention, in the control of the green peach aphid, the corp was found aphid-free. Moreover, the disadvantage of short shelf life is overcome, this disadvantage being inherent in prior pyrethrum compositions, so that the new compositions may be stored substantially indefinitely. Even boiling and freezing is found not to affect the new compositions' stability.

As indicated above, the compositions of the invention basically comprise pyrethrum and the described oils. However, the invention contemplates and in fact the invention prefers the use of additional materials which promote the effectiveness of insecticides generally, apart from those intrinsic properties which adapt them for insect control. In this connection, it is well known to include in insecticides, such materials as have the effect upon coming into contact with insects of setting them in motion, the phenomenon apparently being due to irritation of the insects in some manner. Such materials seem to have the ability to penetrate deeply into crevices and cracks in housing structures and to disseminate widely amongst the foliage of crops and trees, thus reaching underneath leaves, thereby coming into contact with insects present in such places and causing them to migrate, evidently in an effort to escape the irritant. The result of this, as has been observed, is that the insects in their migration into areas touched by the composition come into contact with its active or toxic content, which they might not otherwise do. While there are many such irritants which may be employed in practicing this invention, examples of suitable substances and those preferred are oil of citronella, oil of peppermint, oil of eucalyptus, oil of sassafras, and oil of anise.

It is also preferred in practicing this invention to include an amount of eucalyptus oil, coconut oil, or other similar vegetable oils, especially oils such as exert a stabilizing effect on pyrethrum, rapeseed oil being an example. It is not definitely known what the function of these oils is when used in compositions formulated according to this invention; however, it appears that the new compositions are more effective when such oils are included. It may be that they provide their individual synergistic effects; or, they may act to increase synergism of the fir needle oil.

The basic ingredients of the novel synergized compositions of this invention may be mixed and applied in various proportions. Thus, if desired to employ compositions excluding all active ingredients except the fir needle oil (more broadly, the pine needle oil component) and pyrethrum, one may suitably use from 10 to 40% by weight of an approximately 35% pyrethrum extract, such percentage being equivalent to 3.5% to 14% pyrethrum per se (such being readily available), and from 60 to 90% by weight (86 to 96.5% relative to pyrethrum content per se) of fir needle oil. Preferably, however, the pyrethrum extract is present in quantity of about 20 to 30% by weight, ranging on the higher side where the composition is to be employed for agricultural purposes, the remainder being the fir needle oil. It will be understood that this basic mixture and any other such mixture herein described is then dispersed in a suitable carrying medium for application, hydrocarbon-free water emulsions, wettable powders and dusts being especially preferred for agricultural purposes and hydrocarbon-free solvents for household purposes. It is found that one part by volume of the effective mixtures herein described to as high as 10,000 parts of the carrying medium for agricultural use, and one part by volume to as high as 5,000 parts of carrying medium for household and livestock purposes produces excellent results.

The following table provides an indication of suitable relative quantities which may be employed, particular amounts being selected in practicing the invention considering the insect to be controlled, its rate of reproduction and severity of the infestation, including all of the preferred ingredients. In this table the figures refer to percent by weight and the pyrethrum is a 35% extract.

|  | Broadly suitable | Generally preferred |
| --- | --- | --- |
| Pyrethrum | 2–50 | 8–30 |
| Fir needle oil | 10–75 | 30–45 |
| Eucalyptus oil [1] | 20–75 | 40–55 |
| Oil of citronella [1] | 1–10 | 2–5 |
| Oil of peppermint [1] | ½–5 | 1–3 |

[1] Or other similarly effective agents.

In order more fully to illustrate the invention, exemplary material is set forth hereinafter in the form of tables. In these examples the term Pyrellin refers to a composition prepared according to the invention which composition is defined in detail following each table:

TABLE I

|  | Diluted in H₂O emulsion to— | Average number surviving aphids after two weekly applications |
|---|---|---|
| Pyrellin [1] | 128 p.p.m | 4.9 |
| Pyrellin [1] | 64 p.p.m | 12.4 |
| Pyrethrum (2½% solution in kerosene). | 1,000 p.p.m | 48.7 |
| Siberian fir needle oil (alone) | 640 p.p.m | 261.0 |
| Coconut oil (alone) | 640 p.p.m | 412.5 |
| Oil of citronella (alone) | 640 p.p.m | 286.8 |
| No treatment | | [2] |

[1] Pyrellin—Formula used was:
Ingredients: Percent by weight
    Pyrethrum concentrate (35%) _____ 17½
    Siberian fir needle oil (*Abies siberica*) _____ 40
    Eucalptus oil _____ 32½
    Peppermint oil _____ 5
    Oil of citronella _____ 5
[2] Too numerous to count.

TABLE II

|  | Diluted in H₂O emulsion to— | Average number cabbage loopers surviving per 20 plants at four weekly intervals |
|---|---|---|
| Pyrellin [1] | 64 p.p.m | 7.0 |
| Pyrellin [1] | 512 p.p.m | 5.0 |
| No treatment | | 22.0 |
| Pyrethrum (2½% solution in kerosene). | 5,000 p.p.m | 6.0 |
| Siberian fir needle oil (alone) | 1,000 p.p.m | 15.0 |
| Coconut oil (alone) | 1,000 p.p.m | 20.0 |
| Eucalyptus oil (alone) | 1,000 p.p.m | 29.0 |
| Oil of citronella (alone) | 1,000 p.p.m | 18.0 |

[1] Pyrellin—Same composition as employed in Table I.

TABLE III

|  | Diluted in H₂O Emulsion to— | Average number surviving green peach aphids and loopers per ten plants after two applications at five-day intervals | |
|---|---|---|---|
|  |  | Loopers | Aphids |
| Pyrellin [1] | 640 p.p.m | 4 | 2 |
| No treatment | | 19 | 209 |
| Pyrethrum (2½% solution in kerosene). | 1,280 p.p.m | 12 | 59 |
| Eucalyptus oil | 640 p.p.m | 16 | 168 |
| Eucalyptus oil | 1,280 p.p.m | 21 | 230 |
| Siberian fir needle oil | 640 p.p.m | 14 | 176 |
| Siberian fir needle oil | 1280 p.p.m | 11 | 151 |
| Siberian fir needle oil, Eucalyptus oil, and oil of citronella. | 640 p.p.m. ea | 26 | 98 |

[1] Pyrellin—Same composition as employed in Table I.

The following tables provide a comparison between a commercial composition known as Pyrenone (pyrethrum and piperonyl butoxide) and a composition formulated according to this invention as follows:

*Pyrellin formulation*

Pyrethrins _____ 8% of a 12% pyrethrum extract.
Siberian fir needle oil_ 50%.
Eucalyptus oil _____ 35%.
Oil of citronella _____ 5%.
Oil of peppermint ____ 2%.

The formulations were in Ultrasene and were space sprayed on houseflies according to the standard Peet-Grady technique.

TABLE IV

| Material | Conc. (mg./100 ml.) | | Knockdown (percent) | | | Percent mort. in 24 hours KD Kill |
|---|---|---|---|---|---|---|
|  | Pyrethrum | Synergist | 3 min. | 5 min. | 10 min. |  |
| Pyrellin | 100 | [1] 325 | 98 | 100 | 100 | 100 |
| Do | 25 | 81 | 89 | 95 | 99 | 95 |
| Pyrenone | 25 | 200 | 53 | 75 | 94 | 90 |
| O.T.I | | | 64 | 82 | 94 | 46 |

[1] Synergist—Siberian fir needle oil in all instances of pyrellin in Tables IV and V.

TABLE V

| Material | (Conc. (mg./100 ml.) | | Percent mortality in 24 hours |
|---|---|---|---|
|  | Pyrethrum | Synergist |  |
| Pyrellin | 1.4 | [1] 4.5 | 33 |
| Do | 2.0 | 6.6 | 63 |
| Do | 3.0 | 9.7 | 53 |
| Do | 4.4 | 14.3 | 77 |
| Do | 6.4 | 20.8 | 100 |
| Do | 9.6 | 31.2 | 100 |
| Do | 14.4 | 46.8 | 100 |
| Pyrenone | 3.0 | [2] 15 | 32 |
| Do | 4.4 | 22 | 53 |
| Do | 6.4 | 32 | 66 |
| Do | 9.6 | 48 | 97 |
| Do | 14.4 | 72 | 100 |

[1] Synergist—Siberian fir needle oil in all instances of Pyrellin in Tables IV and V.
[2] Synergist—Piperonyl butoxide in all instances of Pyrenone in Tables IV and V.

In Tables IV and V above, as will be noted, in addition to the pyrethrum extract and Siberian fir needle oil in the quantity indicated, the Pyrellin composition included approximately four and one-half times the weight of the indicated pyrethrum concentrate content of oil of eucalyptus (79–90% eucalyptol) and approximately one-half of the indicated weight of pylrethrum concentrate of oil of citronella. The pyrethrum content was hydrocarbon-free.

It will be appreciated in considering the foregoing tables that the data submitted with respect to individual components of the preferred compositions of the invention is for the purpose of demonstrating the absence of effectiveness of such individual components, thereby rendering the synergistic effects taking place in the preferred compositions more apparent.

In connection with the foregoing tables showing application of the compositions of this invention, it should be mentioned that the pyrethrum content is present substantially entirely free of residual or solvent petroleum oil fractions. As has been indicated heretofore in this specification, pyrethrum customarily is marketed and employed as an insecticide in hydrocarbon oil solution form, such as a kerosene fraction. Moreover, pyrethrum extracts oftentimes contain residues of hydrocarbon oil solvents employed in extracting the pyrethrum from the flower. The presence of such hydrocarbons has been found to be detrimental to plant life because of phytotoxic effects. Therefore, since the compositions herein are recommended for use in the control of insects on plant life, pyrethrum admixed with hydrocarbons is undesirable. Additionally, the beneficial effects of the present invention seem in instances to be more marked where hydrocarbon-free pyrethrum is employed.

The new compositions of the invention, more particularly the compositions employed in Tables I and II have been compared with well-known commercial compositions and, in all instances the new compositions of this invention are found to be superior. For example, the new composition of Table I was utilized to control green peach aphids on celery with the result that 80% of the aphids were destroyed. A well-known insecticide was employed simultaneously and similarly but it provided only 40% control. The new composition of Table I was employed in controlling the green peach aphids on sweet peppers, 65% control being obtained. A second well-known insecticide employed simultaneously and under similar conditions provided only 40% control.

The new compositions of matter may be compounded according to all common methods for convenience and effectiveness of application. As indicated above, in the main, pyrethrum insecticides are dispersed in liquid carriers. In practicing this invention, water dispersion is preferred. It will be understood that the new compositions may be formulated as wettable powders, dusts, aerosols, etc. A variety of carriers may be employed for the preparation of solid products, for example diatomaceous earth, powdered charcoal, pulverized pyrethrum marc, talc, gypsum, bentonite, silica gel, and the like. Some of the carriers are preferred because of their ability to hold the compositions tenaciously thereby reducing volatility and tending to extend life. Bentonite is an excellent example of such a material. In this connection, it might be pointed out that because of the denseness of oils such as cocount oil, eucalyptus oil, sunflower oil, and the like, they also tend to function as volatility retarding agents and for this reason they are especially to be desired in formulating the compositions of the invention. In formulating livestock sprays, the new compositions may be admixed with a resinous material, which upon evaporation of the solvent, becomes deposited upon the hair of the cattle. Pine resins are regarded as suitable in this capacity especially because of their sticky character thereby tending to adhere to the animal as well as to resist washing off. Glycerin also is a desirable ingredient in the new compositions of this invention especially where such compositions are to be used as animal sprays because of the fact that it promotes spreading of the active ingredients quite thoroughly upon the animal. If desired, glycerin may replace the eucalyptus or coconut oil in the above-recited compositions in whole or in part.

It has been found that the compositions of the invention are particularly effective in the control of chinch bugs. For this purpose, it is advantageous to include a quantity of pine syrup diluted with denatured alcohol, for example from about 5 to 30% by weight of a pine syrup composition including about 10 to 40% preferably about 20–25% volume of denatured alcohol.

The new compositions of the invention may be included in preparations especially adapted to attract insects thereby bringing the insects into contact with the effective insecticidal content. For example, oftentimes, it is desirable to formulate such insecticidal composition especially intended for application to roaches in suitable substances which are known to attract roaches in order to facilitate the contact with the new compositions of the invention, which contact is essential to its performance as an insecticide.

Recent work on the active principles of pyrethrum, particularly their synthesis, has resulted in laboratory prepartion of a compound known as allethrin. This compound is reported to be the allyl analogue of cincerin I and is found to be highly toxic. It is especially effective against houseflies. When employed in preparing compositions of the invention, that is to say, replacing the pyrethrum content of the compositions herein disclosed, it is found that excellent results are obtained. Also, compositions may be formulated according to the invention including a quantity of each of pyrethrum and allethrin.

While the invention has been described primarily in terms of naturally occurring pyrethrum extract, such extract being readily available on the market and commonly employed in insecticidal compositions, it is to be understood that the invention extends to new compositions including, in lieu of natural pyrethrum extract, the active components thereof as they may be obtained by separation processes. Also, the invention extends to compositions including synthetic pyrethrum, that is a product including all of the insecticidally-active components of pyrethrum prepared synthetically and which are chemically fully equivalent to the corresponding components in the naturally occurring material. Moreover, it should be pointed out that the invention extends to compositions including less than all of the active components of natural pyrethrum and synthetic pyrethrum. In other words, individual active components of either substance may be combined with the other materials of the compositions of this invention to produce results which reflect the improvements provided by the invention as a result of the synergistic action which has been discovered.

Similarly, as in the foregoing paragraph, the invention extends to compositions including one or more of the active components of the pine needle oil, particularly the Siberion fir needle oil, and also, to compositions including such synthetically-produced oils and their insecticidally-active comopnents. Chemical analysis of the pine needle oil, particularly the Siberian fir needle oil, reveals it to contain 32 to 34% of an ester known as bornyl acetate. Since bornyl acetate is believed to be the principal synergizing component of the oil, it will be understood that the new compositions extend to such materials collectively and individually where they are employed in combination with the pyrethrum and other content herein described as being in the new compositions. The comments of this paragraph, as well as others herein respecting the pine needle oil content, apply to other suitable specific oils, for example, Canadian and Australian fir needle oils which are found to be especially suitable in that they perform substantially similarly to Siberian fir needle oil. While particular individual components of the oils may well be synergistically more effective than other of their components, and even though they may be isolated and employed according to the teachings of this invention, it is, at this time, preferred and seemingly more practical to utilize the entirety of the needle oil content. The entire oil is found to perform desirable physical functions, such as penetration and adhesion of the composition, eliminating the need for hydrocarbon carriers which perform similar physical functions, but in a somewhat less efficient manner and are phytotoxic to plants.

While, as has been indicated above, the invention herein is broadly envisioned as extending to the basic components, i.e. pyrethrum and fir needle oil, it is desired to stress that the basic synergism may be and seems to be enhanced by the presence of the other additives of the type employed in the preferred compositions, and especially by those specifically included in the preferred and exemplary compositions of the tables herein. These additives add very desirably to stabilizatoin, penetration, adhesion and insect movement. For example, the compositions exhibit such strong stability that it is felt that either a physical or chemical interaction has taken place between two or more of the ingredients. Of course, it will be understood that the invention extends to and includes the compositions herein described and claimed in their actual physical and/or chemical form whatever this may be as a result of their association together either initially or later when they are put to use and the claims appended hereto are intended to embrace within the invention any new chemical composition or physical form found to exist in the compositions as a result of their formulation, storage and use.

The term "irritant" as used in this specification and in the claims is employed as synonymous with "repellent," the latter being a term employed rather commonly in describing materials having the disturbing effects described herein upon insects.

Those skilled in the art will understand that the compositions of this invention may include any other ingredients found to be suitable and known for their use in insecticidal compositions. For example, stabilizing materials in addition to those included in the present compositions may be employed or, if desired, they may be used in lieu of stabilizing materials herein described.

It is desired to remark that in the course of conducting the studies leading to the pursuant to this invention, no toxicity to human beings or warm blooded animals has been observed.

It is desired to mention that certain of the compositions of this invention, particularly those designated by the term Pyrellin herein, have been found to have significant and consistent growth stimulating effects on plants. This has been noted on plants which have been insect-free at time of application of the compositions. For example, accelerated plant growth after applying the Pyrellin composition herein described has been noted on tomato, bougainvillea, and cabbage plants.

Those skilled in the art will understand that the invention contemplates and extends to compositions of the type herein described and claimed including also other active materials such as systemic insecticides, DDT for example, fertilizers, weed killers, etc.

It is found that the results of the Pyrellin compositions herein where DDT is included as an ingredient are superior.

It is believed that the foregoing descriptive material renders the invention herein readily understood and capable of being put into practice. Additionally its metes and bounds are thought to have been made clear. However, nothing herein set forth is intended to limit the invention unduly. Accordingly, modifications, and variation of process details, and the substitution of components which perform similarly, and the like deviations from specific matter herein, such as those derivable from the teaching respecting the invention or which will henceforth be obvious to those skilled in the art are not excluded from the contemplated and intended scope of the invention.

What is claimed is:

1. An insecticidal composition of matter comprising pyrethrum in quantity by weight of about 3.5% to about 14% and, relative to said pyrethrum content, from about 86 to about 96.5% by weight of an oil selected from the group consisting of Siberian fir needle oil, Canadian fir needle oil and Australian fir needle oil.

2. A composition of matter as claimed in claim 1 comprising also at least one oil from the group consisting of oil of peppermint, oil of citronella, oil of eucalyptus, oil of sassafras, oil of anise, coconut oil and rapeseed oil.

3. An insecticidal composition of matter comprising from about 8 to about 30% by weight of a 35% pyrethrum extract, from about 30 to 45% by weight of an oil selected from the group consisting of Siberian fir needle oil, Canadian fir needle oil and Australian fir needle oil, from about 40 to 55% by weight of eucalyptus oil, from 2 to 5% of oil of citronella and from about 1 to 3% by weight of oil of peppermint.

References Cited in the file of this patent

UNITED STATES PATENTS

| | | |
|---|---|---|
| 281,521 | Kingzett | July 17, 1882 |
| 788,155 | Horton | Apr. 25, 1905 |
| 798,603 | Everette | Sept. 5, 1905 |
| 1,370,263 | Babb | Mar. 1, 1921 |
| 1,619,861 | Gordon | Mar. 8, 1927 |

FOREIGN PATENTS

| | | |
|---|---|---|
| 401,519 | Great Britain | Jan. 2, 1933 |

OTHER REFERENCES

King: U.S. Dept. Agr. Handbook No. 69, 1954, pp. 245–247.